(12) United States Patent
Asawa et al.

(10) Patent No.: US 11,403,565 B2
(45) Date of Patent: Aug. 2, 2022

(54) METHOD AND SYSTEM FOR GENERATING A LEARNING PATH USING MACHINE LEARNING

(71) Applicant: WIPRO LIMITED, Bangalore (IN)

(72) Inventors: Swapnil Asawa, New Delhi (IN); Rahul Siripurapu, Jawaharnagar (IN)

(73) Assignee: Wipro Limited, Bangalore (IN)

( * ) Notice: Subject to any disclaimer, the term of this patent is extended or adjusted under 35 U.S.C. 154(b) by 918 days.

(21) Appl. No.: 16/202,121

(22) Filed: Nov. 28, 2018

(65) Prior Publication Data
US 2020/0118035 A1  Apr. 16, 2020

(30) Foreign Application Priority Data

Oct. 10, 2018 (IN) .............................. 201841038517

(51) Int. Cl.
  *G06N 20/20* (2019.01)
  *G09B 7/00* (2006.01)
  *G06F 16/22* (2019.01)

(52) U.S. Cl.
  CPC ............. *G06N 20/20* (2019.01); *G06F 16/22* (2019.01); *G09B 7/00* (2013.01)

(58) Field of Classification Search
  CPC ................................ G06N 20/20; G06F 16/22
  See application file for complete search history.

(56) References Cited

U.S. PATENT DOCUMENTS

| | | | |
|---|---|---|---|
| 6,091,930 A | 7/2000 | Mortimer et al. | |
| 6,909,874 B2 | 6/2005 | Holtz et al. | |
| 7,050,753 B2 | 5/2006 | Knutson | |
| 2002/0087560 A1 | 7/2002 | Bardwell | |
| 2009/0049077 A1 | 2/2009 | Lawlor | |
| 2009/0327883 A1* | 12/2009 | Robertson | G06F 16/44 715/273 |
| 2010/0041007 A1 | 2/2010 | Wang | |
| 2010/0076968 A1* | 3/2010 | Boyns | H04L 67/22 707/732 |
| 2011/0065082 A1 | 3/2011 | Gal et al. | |
| 2011/0265026 A1* | 10/2011 | Tarassenko | G16H 50/70 715/771 |

(Continued)

OTHER PUBLICATIONS www.metacademy.org, website (2018), 1 page.

*Primary Examiner* — David E Choi
(74) *Attorney, Agent, or Firm* — Finnegan, Henderson, Farabow, Garrett & Dunner, LLP

(57) ABSTRACT

This disclosure relates generally to information processing, and more particularly to method and system for generating a learning path for a topic. The method may include extracting a plurality of key phrases from each of a plurality of learning resources related to the topic, determining a learning context for each of the plurality of learning resources based on the plurality of key phrases, forming a set of key phrase groups from among the plurality of key phrases for each of the plurality of learning resources, determining a relationship among the key phrases in each of the set of key phrase groups based on the learning context, generating a structured graph for the plurality of learning resources based on the plurality of key phrases and the relationship among the key phrases, and generating the learning path for the topic based on the structured graph for the plurality of learning resources.

16 Claims, 6 Drawing Sheets

(56) References Cited

U.S. PATENT DOCUMENTS

2014/0370488 A1   12/2014  Kapoor
2014/0372447 A1*  12/2014  Cheong ................ G06F 16/367
                                                                        707/741
2020/0118035 A1*   4/2020  Asawa ..................... G09B 7/00
2020/0202074 A1*   6/2020  Ghulati ................ G06F 40/205

* cited by examiner

METHOD AND SYSTEM FOR GENERATING A LEARNING PATH USING MACHINE LEARNING

TECHNICAL FIELD

This disclosure relates generally to information processing, and more particularly to method and system for generating a learning path using machine learning.

BACKGROUND

Internet has provided access to a vast amount of learning resources on a variety of topics. A user intending to learn a topic may access websites (for example, WIKIPEDIA®, GOOGLE®, etc.), search for the topic, and go over one or more webpages. However, the information available on any given topic may be scattered over multiple webpages from multiple different websites. Typically, the user may find that a webpage may link to another page, which may then link to yet another page, and so forth. It may be challenging to efficiently and effectively navigate through these multiple webpages linked through each other, and get a quick understanding of the topic. Thus, a user visiting WIKIPEDIA® or similar websites seldom has a reasonably tailored and time bound learning experience.

Alternatively, the user may choose to enroll for a structured course on the topic. However, most courses cover a broad syllabus. Therefore, such courses may not be useful for the user desiring to grasp a quick understanding of a topic for a very specific purpose without wasting time in understanding unnecessary content while following the course format. The other resort left for the user may be to consult a human expert on the topic, but this has its own limitations. It is challenging to find the expert immediately, validate the credential of the expert with respect to the particular topic, set up an appointment with the expert, meet the expert, and, finally, understand the topic.

SUMMARY

In one embodiment, a method for generating a learning path for a topic is disclosed. In one example, the method may include extracting a plurality of key phrases from each of a plurality of learning resources related to the topic. The method may further include determining a learning context for each of the plurality of learning resources based on the plurality of key phrases. The method may further include forming a set of key phrase groups from among the plurality of key phrases for each of the plurality of learning resources. The method may further include determining a relationship among the key phrases in each of the set of key phrase groups based on the learning context. The method may further include generating a structured graph for the plurality of learning resources based on the plurality of key phrases and the relationship among the key phrases. The method may further include generating the learning path for the topic based on the structured graph for the plurality of learning resources.

In one embodiment, a system for generating a learning path for a topic is disclosed. In one example, the system may include a learning path generation device, which may include at least one processor and a memory communicatively coupled to the at least one processor. The memory may store processor-executable instructions, which, on execution, may cause the processor to extract a plurality of key phrases from each of a plurality of learning resources related to the topic. The processor-executable instructions, on execution, may further cause the processor to determine a learning context for each of the plurality of learning resources based on the plurality of key phrases. The processor-executable instructions, on execution, may further cause the processor to form a set of key phrase groups from among the plurality of key phrases for each of the plurality of learning resources. The processor-executable instructions, on execution, may further cause the processor to determine a relationship among the key phrases in each of the set of key phrase groups based on the learning context. The processor-executable instructions, on execution, may further cause the processor to generate a structured graph for the plurality of learning resources based on the plurality of key phrases and the relationship among the key phrases. The processor-executable instructions, on execution, may further cause the processor to generate the learning path for the topic based on the structured graph for the plurality of learning resources.

In one embodiment, a non-transitory computer-readable medium storing computer-executable instructions for generating a learning path for a topic is disclosed. In one example, the stored instructions, when executed by a processor, may cause the processor to perform operations including extracting a plurality of key phrases from each of a plurality of learning resources related to the topic. The operations may further include determining a learning context for each of the plurality of learning resources based on the plurality of key phrases. The operations may further include forming a set of key phrase groups from among the plurality of key phrases for each of the plurality of learning resources. The operations may further include determining a relationship among the key phrases in each of the set of key phrase groups based on the learning context. The operations may further include generating a structured graph for the plurality of learning resources based on the plurality of key phrases and the relationship among the key phrases. The operations may further include generating the learning path for the topic based on the structured graph for the plurality of learning resources.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
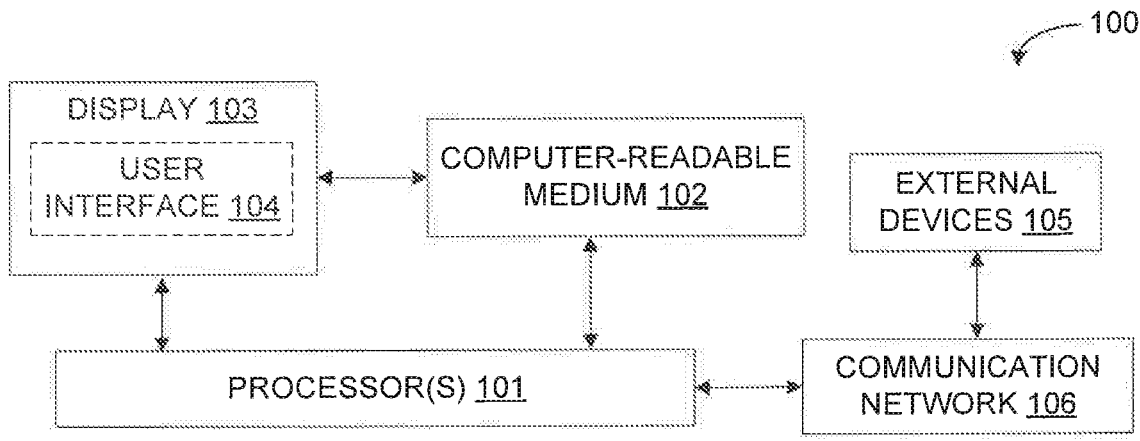
FIG. 1 is a block diagram of an exemplary system for generating a learning path using machine learning, in accordance with some embodiments of the present disclosure.

Referring now to FIG. 1, an exemplary system 100 for generating a learning path using machine learning is illustrated, in accordance with some embodiments of the present disclosure. The system may implement a learning path generation engine, which may generate a learning path for a topic. In particular, the system 100 may include a learning path generation device (for example, server, desktop, laptop, notebook, netbook, tablet, smartphone, mobile phone, or any other computing device) that may implement the learning path generation engine. It should be noted that, in some embodiments, the learning path generation engine may generate a sequential learning path based on a structured graph, which, in turn, may be generated using key phrases and their relation based on the context of any learning resource (e.g., any document) by employing machine learning algorithm.

As will be described in greater detail in conjunction with FIGS. 2-4, the learning path generation engine may extract a plurality of key phrases from each of a plurality of learning resources related to the topic, determine a learning context for each of the plurality of learning resources based on the plurality of key phrases, form a set of key phrase groups from among the plurality of key phrases for each of the plurality of learning resources, and determine a relationship among the key phrases in each of the set of key phrase groups based on the learning context. The learning path generation engine may then generate a structured graph for the plurality of learning resources based on the plurality of key phrases and the relationship among the key phrases, and generate the learning path for the topic based on the structured graph for the plurality of learning resources. Additionally, the learning path generation engine may generate a personalized learning path for a user based on a current understanding of the user on the topic and the learning path for the topic, wherein the current understanding of the user is determined based on an input from the user. Further, the learning path generation engine may determine a learning time for the user based on the personalized learning path.

The system 100 may include one or more processors 101, a computer-readable medium (for example, a memory) 102, and a display 103. The computer-readable storage medium 102 may store instructions that, when executed by the one or more processors 101, cause the one or more processors 101 to generate learning path for a topic, in accordance with aspects of the present disclosure. The computer-readable storage medium 102 may also store various data (for example, topic of interest, learning resources, key phrases, learning context for each learning resource, key phrase groups, relationship among the key phrases in each key phrase group, a structured graph for the learning resources, learning path, personalized learning path, learning time, machine learning algorithms, tags, n-gram frequencies, probability of occurrence of a key phrase in a key phase group, a nature of relationships among the key phrases in a key phrase group, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
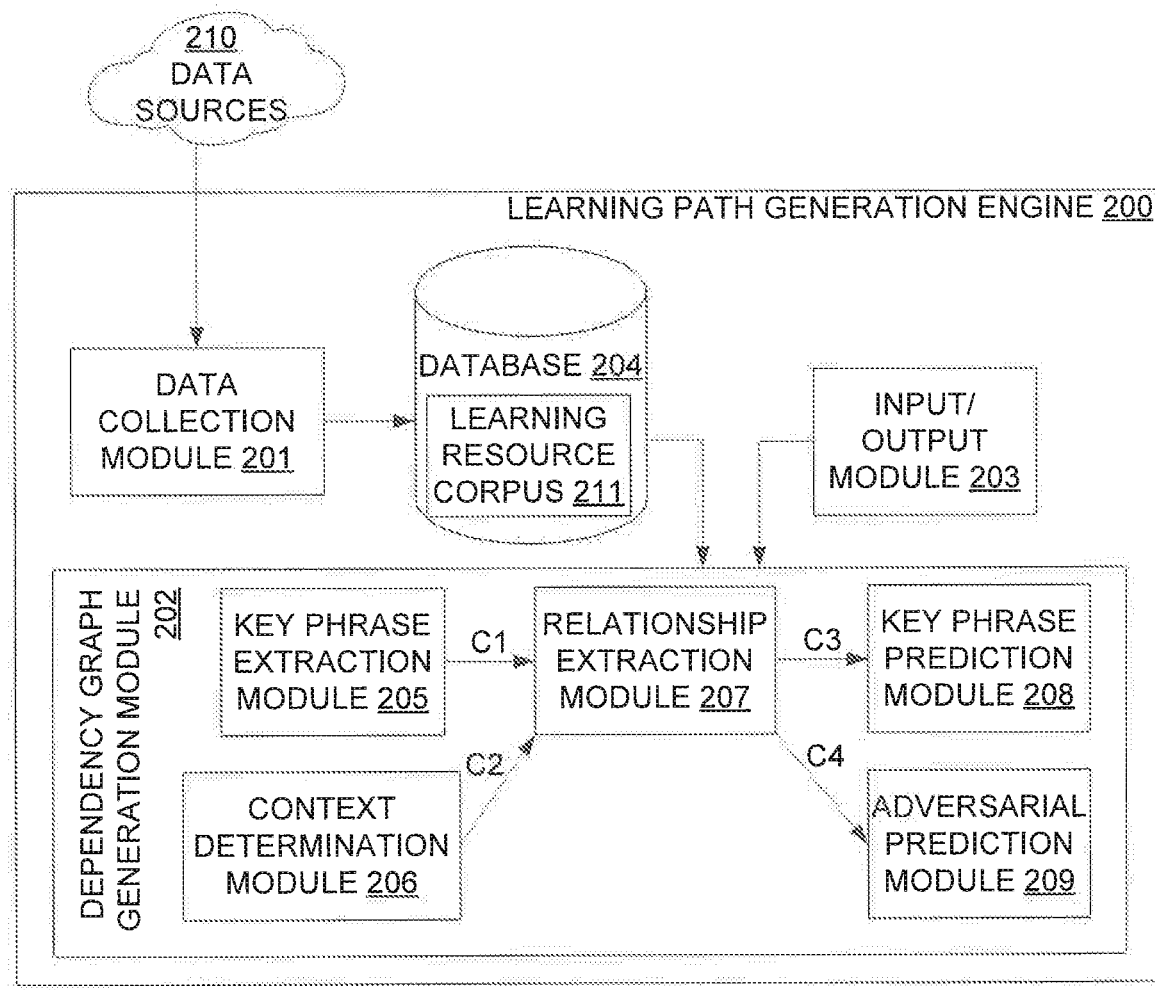
FIG. 2 is a functional block diagram of a learning path generation device, in accordance with some embodiments of the present disclosure.

Referring now to FIG. 2, a functional block diagram of a learning path generation engine 200, implemented by the system 100 of FIG. 1, is illustrated, in accordance with some embodiments of the present disclosure. The learning path generation engine 200 may include various modules that perform various functions so as to generate a learning path for a topic. In some embodiments, the learning path generation engine 200 may include a data collection module 201, a dependency graph generation module 202, an input/output module 203, and a database 204. Further, in some embodiments, the dependency graph generation module 202 may include a key phrase extraction module 205, a context determination module 206, a relationship extraction module 207, a key phrase prediction module 208, and an adversarial prediction module 209.

The data collection module 201 may scrape learning resources from various data sources 210 accessible over a communication network. The data collection module 201 may then store the collected learning resources in the learning resource corpus 211 within the database 204. Various data sources may include, but may not be limited to, reputed websites, highly rated blogs, websites suggested by users, a collection of learning resources curated by users, and websites referred to in the collected learning resources. Additionally, the learning resources may include, but may not be limited to, a digital document, a webpage, and a media file. It should be noted that the learning resource may be relevant to a topic of interest to the user. Additionally, it should be noted that the data collection module 201 may store the learning resources along with their metadata. Such metadata may include, but may not be limited to, number of citations in a learning resource, name of the learning resource, name of the data source where the learning resource was available, index terms, author names, and topic name. Further, it should be noted that the data collection module 201 may periodically update the corpus with new learning resources.

The dependency graph generation module 202 may receive the collected learning resources with respect to a topic of interest from the learning resource corpus 211. The dependency graph generation module 202 may then process the collected learning resources so as to generate a knowledge dependency graph for the topic of interest. As will be appreciated, the knowledge dependency graph may be periodically updated as and when the data collection module 201 may update the corpus with new learning resources. The generated knowledge dependency graph may then be employed to provide a learning path for the topic of interest to the user.

The input/output module 203 may provide a graphical user interface (GUI) for the user to interact with the learning path generation engine 200. In particular, the users may query about their topic of interest through the GUI. Additionally, the users may provide input with respect their current level of understanding on their topic of interest. For example, the user may provide input, on various prerequisites identified for the topic of interest, through the GUI. The learning path generation engine 200 may then determine a level of understanding (i.e., prior knowledge) of the user based on the input, and provide a suitable time-bound learning path to the user so as to understand the topic of interest. The learning path and estimated time to complete the learning path may then be provided to the user through the GUI.

The key phrase extraction module 205 may extract key phrases from each of the learning resources. A key phrase may be a scientific or a meaningful phase (for example, 'supervised learning', 'learning methodologies' etc.). In some embodiments, the key phrase extraction module 205 may build and train a first machine learning algorithm (e.g., artificial neural network) for extracting key phrases from each of the learning resources. The key phrase extraction module 205 may then employ the first machine learning algorithm so as to extract key phrases from any learning resource. The key phrase extraction module may also form a set of key phrase groups for each learning resources from the extracted key phrases.

The context determination module 206 may determine the context of each learning resources collected by data collection module 201 based on the extracted key phrases. In some embodiments, the context determination module 206 may employ a second machine learning algorithm (e.g., artificial neural network) so as to determine context of a learning resource based on the set of key phrase groups. It should be noted that the second machine learning algorithm may be long short-term memory (LSTM) recurrent neural network.

The relationship extraction module 207 may receive key phrases or key phrase groups for a learning resource from the key phrase extraction module 205 via a C1 interface using standard wired or wireless data transfer protocols. Additionally, the relationship extraction module 207 may receive context of the learning resource from the context determination module 206 via a C2 interface using standard wired or wireless data transfer protocols. The relationship extraction module 207 may then determine relationship among key phrases in each key phrase group based on the context. In some embodiments, the relationship extraction module 207 may employ a third machine learning algorithm (e.g., artificial neural network) so as to determine the relationship. The relationship may include a probability of occurrence of a key phrase in a given key phase group (e.g., key phrase pair) in presence of remaining key phrases in the key phase group. The relationship may also include a unit latent vector that may determine a nature of relationship among key phrases in each key phrase group in high dimensional space based on its direction. The nature of relationship may include, but may not be limited to, a parent-child relationship, a prerequisite-postrequisite relationship, a related relationship, or an independent relationship.

The key phrase prediction module 208 may receive a key phrase group and the unit latent vector from the relationship extraction module 207 via a C3 interface using standard wired or wireless data transfer protocols. The key phrase prediction module 208 may then validate the determined relationship by predicting occurrence of certain key phrases of each key phrase group based on the unit latent vector and the remaining key phrases of that key phrase group. In some embodiments, the key phrase prediction module 208 may employ a fourth machine learning algorithm (e.g., artificial neural network) so as to validate the relationship.

Further, the adversarial prediction module 209 may receive the unit latent vector from the relationship extraction module 207 via a C4 interface using standard wired or wireless data transfer protocols. The adversarial prediction module 209 may then validate the determined relationship by predicting occurrence of certain key phrases of each key phrase group based on the unit latent vector. In some embodiments, the adversarial prediction module 209 may employ a fifth machine learning algorithm (e.g., artificial neural network) so as to validate the relationship.

Thus, the key phrase prediction module 208 and the adversarial prediction module 209 may determine a part of loss for the relationship extraction module 207. Upon validation, the key phrase groups and the unit latent vectors may be employed to create knowledge dependency graphs.

It should be noted that the learning path generation engine 200 may be implemented in programmable hardware devices such as programmable gate arrays, programmable array logic, programmable logic devices, and so forth. Alternatively, the learning path generation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for generating a learning path using machine learning. For example, the exemplary system 100 and the associated learning path generation engine 200 may generate a learning path for a topic by the processes discussed herein. In particular, as will be appreciated by those of ordinary skill in the art, control logic and/or automated routines for performing the techniques and steps described herein may be implemented by the system 100 and the learning path generation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
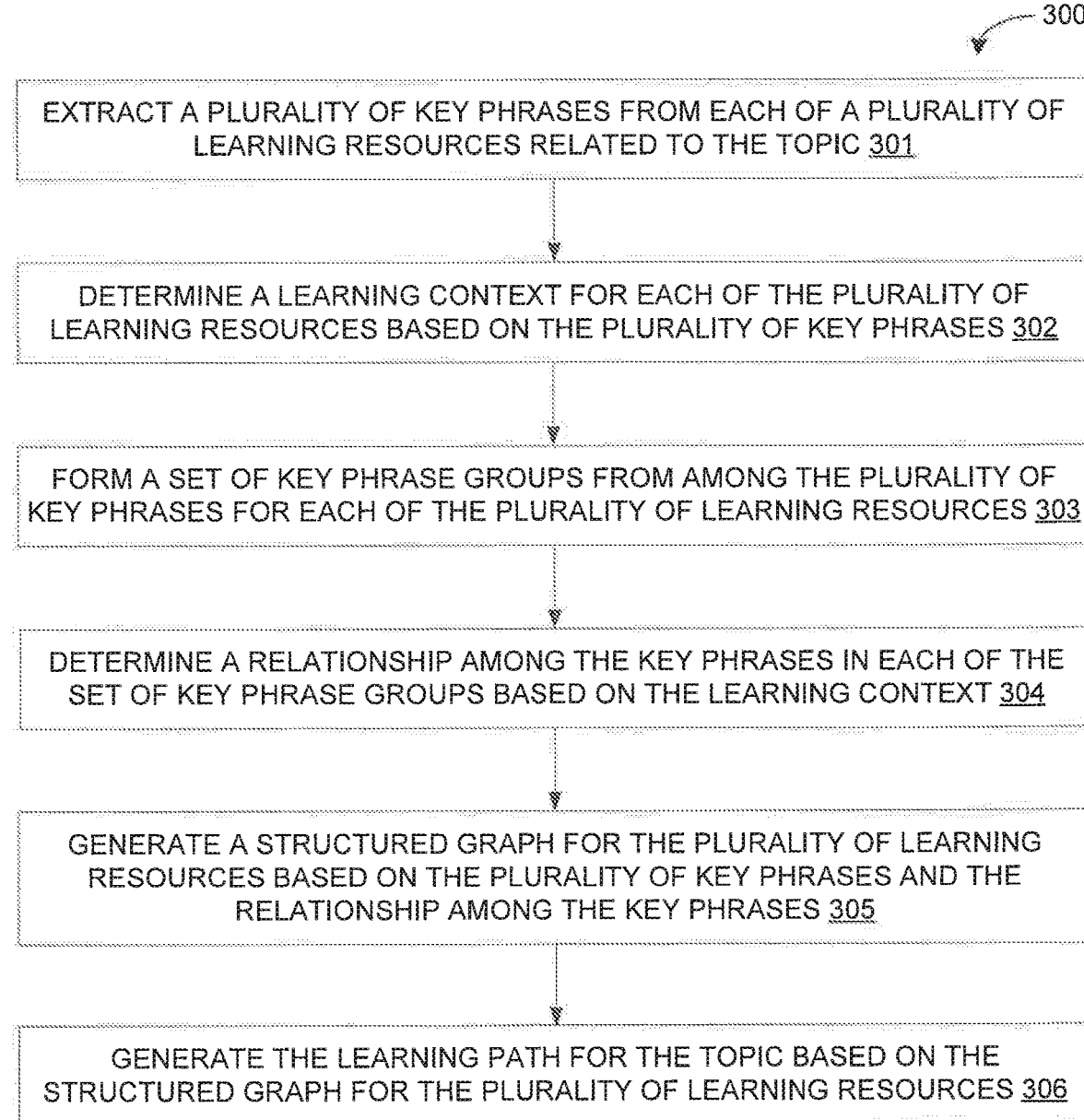
FIG. 3 is a flow diagram of an exemplary process for generating a learning path for a topic, in accordance with some embodiments of the present disclosure.

For example, referring now to FIG. 3, exemplary control logic 300 for generating a learning path for a topic via a system, such as the system 100, is depicted via a flowchart, in accordance with some embodiments of the present disclosure. As illustrated in the flowchart, the control logic 300 may include the steps of extracting a plurality of key phrases from each of a plurality of learning resources related to the topic at step 301, determining a learning context for each of the plurality of learning resources based on the plurality of key phrases at step 302, forming a set of key phrase groups from among the plurality of key phrases for each of the plurality of learning resources at step 303, and determining a relationship among the key phrases in each of the set of key phrase groups based on the learning context at step 304. The control logic 300 may further include the steps of generating a structured graph for the plurality of learning resources based on the plurality of key phrases and the relationship among the key phrases at step 305, and generating the learning path for the topic based on the structured graph for the plurality of learning resources at step 306.

In some embodiments, the control logic 300 may further include the steps of acquiring the plurality of learning resources relevant to the topic, and storing the plurality of learning resources in a database. Additionally, in some embodiments, the control logic 300 may further include the step of generating a personalized learning path for a user based on a current understanding of the user on the topic and the learning path for the topic. It should be noted that, in such embodiments, the current understanding of the user may be determined based on an input from the user on one or more prerequisites identified for the topic. Moreover, in some embodiments, the control logic 300 may further include the step of determining a learning time for the user based on the personalized learning path.

In some embodiments, the plurality of key phrases may be extracted at step 301, using a first machine learning algorithm, by determining a set of n-gram frequencies based on a set of tags in a given learning resource, and by determining the plurality of key phrases based on the set of n-gram frequencies. Additionally, in some embodiments, the learning context may be determined at step 302, using a second machine learning algorithm. In some embodiments, the second machine learning algorithm may be a long short-term memory (LSTM) machine learning algorithm.

In some embodiments, key phrase groups at step 303 may include key phrase pairs. Additionally, in some embodiments, each of the set of key phrase pairs may be formed by pairing each of the plurality of key phrases of a given learning resource with at least one of: each of a plurality of remaining key phrases of the given learning resource, or each of a plurality of randomly selected key phrases from a corpus of key phrases related to the topic.

In some embodiments, the relationship among the key phrases in a given key phrase group may be determined, at step 304, using a third machine learning algorithm, by determining a probability of occurrence of a key phrase in the given key phase group in presence of remaining key phrases in the given key phase group, and by determining a nature of relationships among the key phrases, in the given key phase group, in a multi-dimension space. In such embodiments, the nature of relationships may be derived based on a direction of the output vector (i.e., unit latent vector) of the third machine learning algorithm. Additionally, in such embodiments, the nature of relationship may include a parent-child relationship, a prerequisite-postrequisite relationship, a related relationship, or an independent relationship.

Further, in some embodiments, the control logic 300 may include the step of validating, using a fourth and a fifth machine learning algorithm, the relationship among the key phrases in the given key phrase group. In such embodiments, the validation may be performed by comparing output of the third machine learning algorithm (predicted key phrase) vis a vis output (i.e., predicted key phrase) of the fourth or the fifth machine learning algorithm. Moreover, in such embodiments, the control logic 300 may include the step of tuning the third machine learning algorithm based on the validation.

Figure 4:
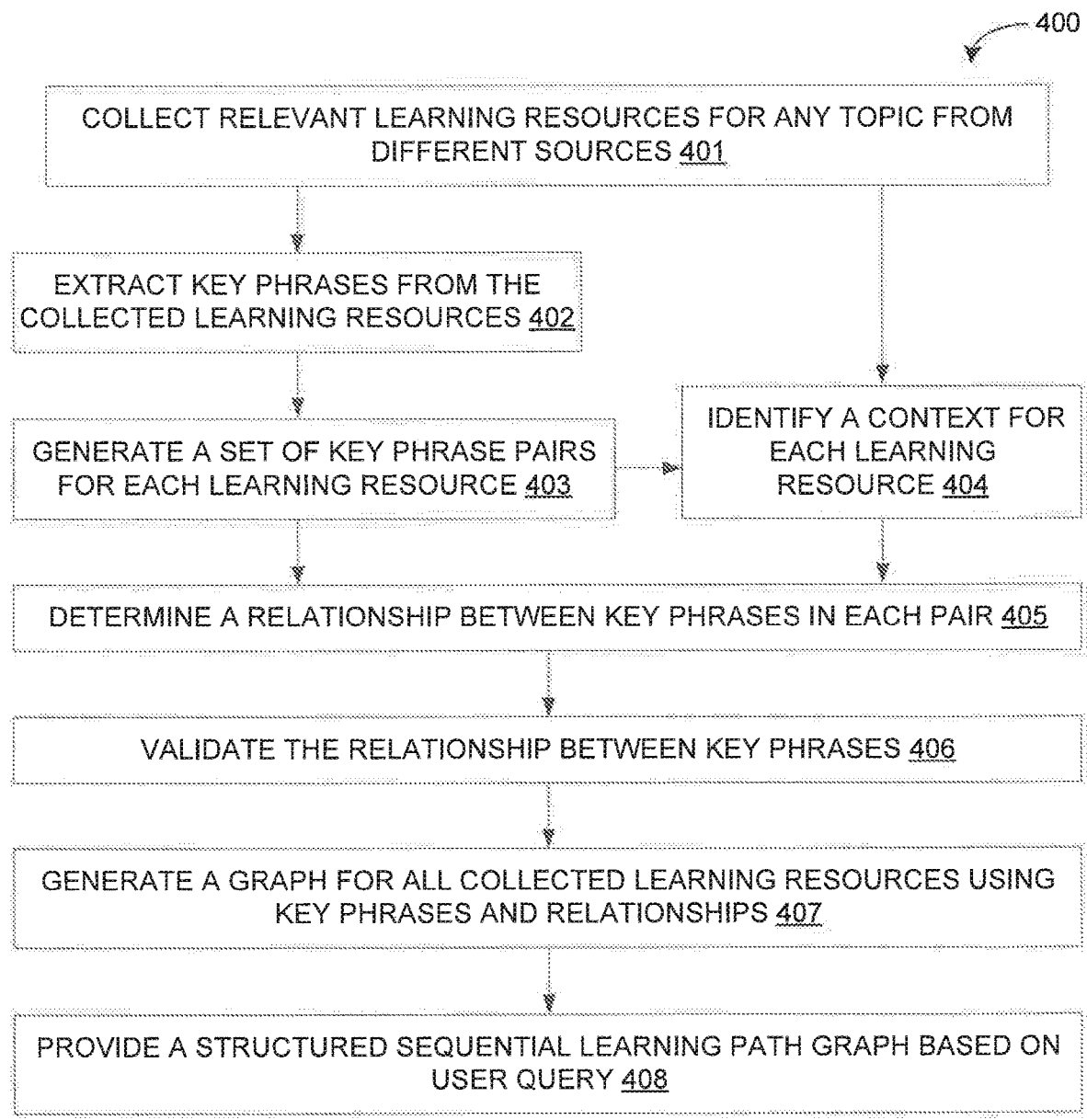
FIG. 4 is a flow diagram of a detailed exemplary process for generating a learning path for a topic, in accordance with some embodiments of the present disclosure.

Referring now to FIG. 4, exemplary control logic 400 for generating a learning path for a topic is depicted in greater detail via a flowchart, in accordance with some embodiments of the present disclosure. As illustrated in the flowchart, at step 401, the control logic 400 may collect relevant learning resources (e.g., documents) for any topic from different sources. As discussed above, the data collection module 201 may fetch the documents from various reputed websites (e.g., WIKIPEDIA®) blogs, archives (e.g., arXiv®), and journals. Additionally, the data collection module 201 may get a set of sources that may be highly suggested by users. The data collection module 201 may scrape documents from the sources along with metadata (e.g., number of citations, journal name, index terms, author names, topic name, etc.) of the documents. Further, the data collection module 201 may identify any external links referred by the documents and update the list of existing sources. Moreover, the data collection module 201 may update document corpus with documents from updated sources list. As will be appreciated, the data collection module 201 may repeat the document collection process periodically.

Figure 5:
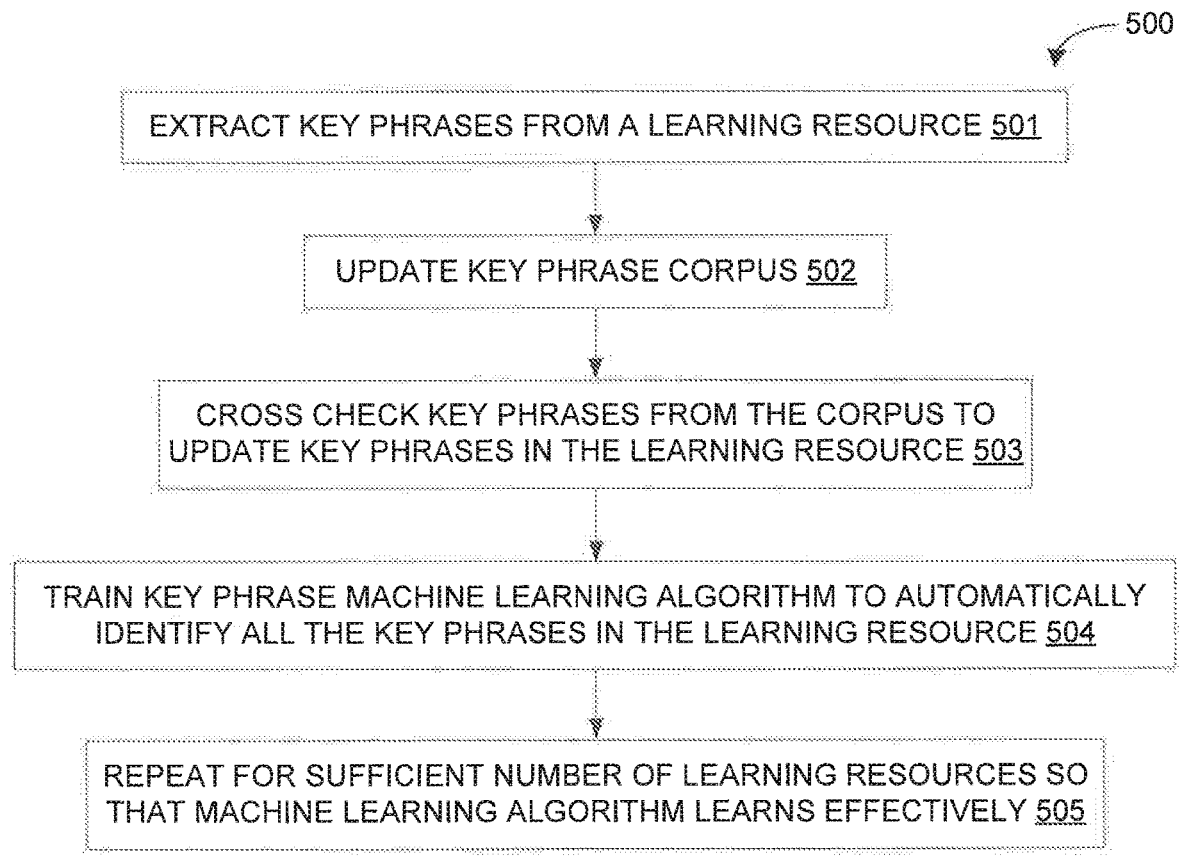
FIG. 5 is a flow diagram of an exemplary process for training a machine learning algorithm for extracting key phrases from learning resources, in accordance with some embodiments of the present disclosure.

At step 402, the control logic 400 may extract key phrases from the collected learning resources. As discussed above, in some embodiments, the key phrase extraction module 205 may build and train a first machine learning algorithm (e.g., artificial neural network) so as to identify and extract key phrases (KPs) from the documents. Referring now to FIG. 5, exemplary control logic 500 for training the first machine learning algorithm for extracting KPs from learning resources is depicted via a flowchart, in accordance with some embodiments of the present disclosure. As illustrated in the flowchart, at step 501, the control logic 500 may extract KPs from a learning resource. For example, in some embodiments, the key phrase extraction module 205 may use tags from a document and obtain n-gram frequencies. The key phrase extraction module 205 may then use the n-gram frequencies as heuristic to identify and extract KPs from the document. At step 502, the control logic 500 may update the key phrase corpus. For example, the key phrase extraction module 205 may add KPs extracted from the document in a key phrase corpus, which may also store KPs from all the documents in the document corpus. At step 503, the control logic 500 may cross check KPs from the key phrase corpus to update the KPs in the learning resource. For example, apart from tags, the key phrase extraction module 205 may also add KPs that are present in the key phrase corpus as well as KPs that are coming in a particular document with good n-gram frequency, in that document's key phrase list.

At step 504, the control logic 500 may train the first machine learning algorithm so as to automatically identify all KPs in the learning resource. For example, as stated above, the key phrase extraction module 205 may include the first machine learning algorithm so as to determine if a randomly selected phrase from the document is a key phrase using existing tags, n-gram frequency along with WordNet frequency as heuristics. At step 505, the control logic 500 may repeat the step 504 with a sufficient number of learning resources such that the first machine learning algorithm may learn effectively. For example, the key phrase extraction module 205 may repeat above exercise for a sufficient number of documents in the document corpus so as to train the first machine learning algorithm to perform satisfactorily. It should be noted that, upon training, given a document as the only input, the first machine learning algorithm may be able to identify all the important KPs in the document. Thus, upon training, the key phrase extraction module 205 may employ the first machine learning algorithm to obtain a complete set of KPs from the entire document corpus.

Figure 6:
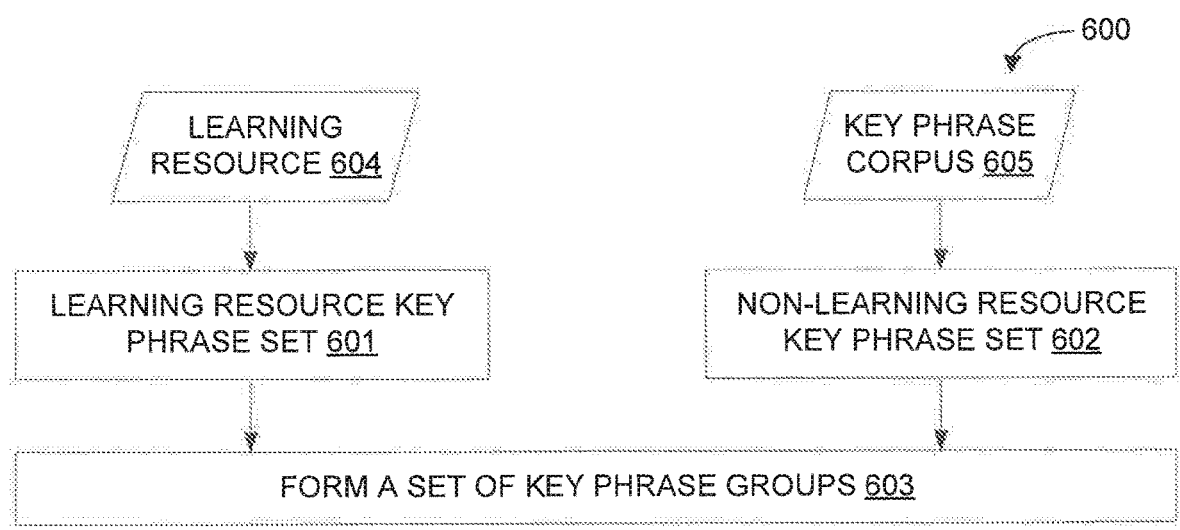
FIG. 6 is a flow diagram of an exemplary process for generating a set of key phrase pairs for each learning resource, in accordance with some embodiments of the present disclosure.

Referring back to FIG. 4, at step 403, the control logic 400 may generate a set of key phrase pairs for each learning resource. Referring now to FIG. 6, exemplary control logic 600 for generating a set of key phrase pairs for each learning resource is depicted via a flowchart, in accordance with some embodiments of the present disclosure. As illustrated in the flowchart, at step 601, the control logic 600 may form a set of KPs from a learning resource 604. For example, the key phrase extraction module 205 may fetch KPs from the document and put them in a 'document key phrase set'. Similarly, at step 602, the control logic 600 may form a set of KPs from the key phrase corpus 605. For example, the key phrase extraction module 205 may fetch same amount of KPs that are not present in the document and put in 'non-document key phrase set'. Further, at step 603, the control logic 600 may form a set of key phrase groups. For example, in some embodiments, the key phrase extraction module 205 may form pairs of each of document key phrase set. The key phrase extraction module 205 may also form pairs of KPs from document key phrase set with a few randomly selected KPs from non-document key phrase set. The key phrase extraction module 205 may then store all their pairs together in a "key phrase pairs set" for the document.

Referring back to FIG. 4, at step 404, the control logic 400 may identify a context for each learning resource. As discussed above, in some embodiments, the context determination module 206 may build and train a second machine learning algorithm (e.g., artificial neural network) so as to identify the context of each document. In some embodiments, the second machine learning algorithm may be a LSTM recurrent neural network. The LSTM network may be trained using document classification using unsupervised learning. The document and document key phrase set may be provided as input to the LSTM network. The output may be the context embedding that is trained to minimize Euclidean distance in the representation space based on domain (using the meta data) of the document.

Figure 7:
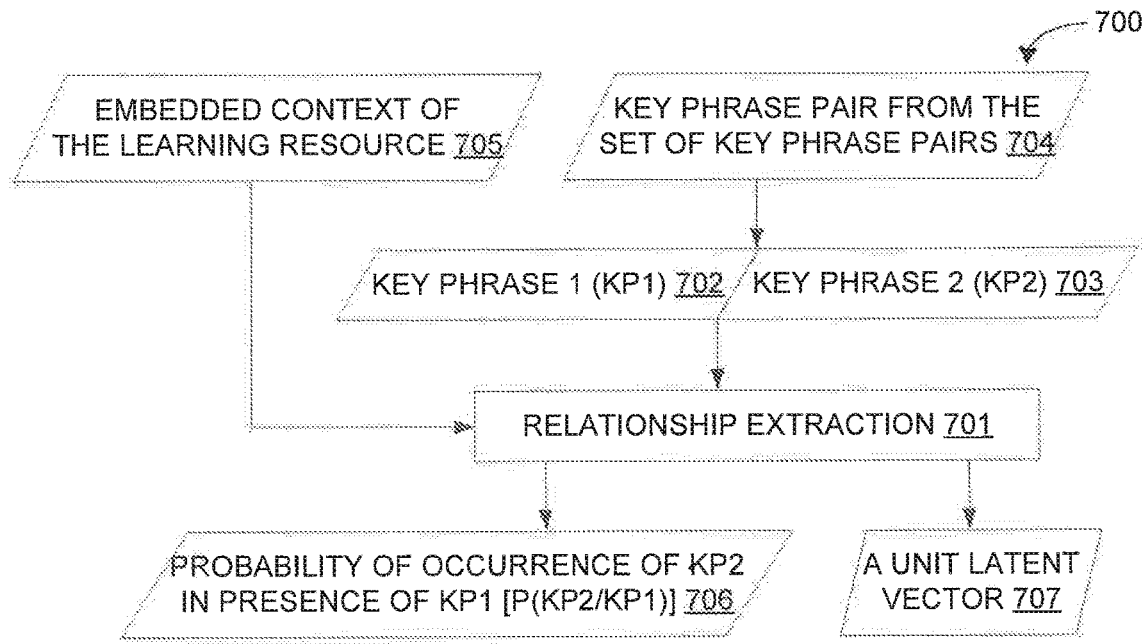
FIG. 7 is a flow diagram of an exemplary process for determining a relationship between key phrases in each key phrase pair, in accordance with some embodiments of the present disclosure.

At step 405, the control logic 400 may determine a relationship between KPs in each key phrase pair of a learning resource based on the context of the learning resource. Referring now to FIG. 7, exemplary control logic 700 for determining a relationship between KPs in each key phrase pair is depicted via a flowchart, in accordance with some embodiments of the present disclosure. As illustrated in the flowchart, at step 701, the control logic 700 may receive a key phrase pair key phrase 1 (KP1) 702 and key phrase 2 (KP2) 703 from the set of key phrase pairs 704. As step 701, the control logic 700 may also receive embedded context of the learning resource 705. Upon receiving the inputs, at step 701, the control logic 700 may extract relationship between KP1 702 and KP2 703 based on the embedded context 705. The relationship may include a probability of occurrence 706 of a key phrase in a given key phase group (e.g., key phrase pair) in presence of remaining key phrases in the key phase group. The relationship may also include a unit latent vector 707 that may determine a nature of relationship among key phrases in each key phrase group. As discussed above, in some embodiments, the relationship extraction module 207 may build and train a third machine learning algorithm (e.g., artificial neural network) so as to determine the relationship between key phrases in the key phrase group.

For example, the relationship extraction module 207 may receive the inputs for the third machine learning algorithm. In some embodiments, the inputs may include two KPs (e.g., KP1 and KP2) from each key phrase pair along with the context embedding. In some embodiments, the relationship extraction module 207 may also reverse the ordered pair and also feed it to the third machine learning algorithm. It should be noted that the input may be fed concurrently. The machine learning algorithm may then output the probability of occurrence KP2 of the pair in presence of KP1 and vice versa. The machine learning algorithm may also output a unit latent vector. The unit latent vector may provide a sense of the relationship between the KP1 and KP2, which may be unique for them. However, it should be noted that the unit latent vector may not store information about the KPs itself. As will be appreciated, KP1 and the information with respect to the unit latent vector may be employed to predict KP2.

In some embodiments, it may be useful to determine losses of the third machine learning algorithm employed by the relationship extraction module 207. The losses may be calculated so as to estimate gradients and to update the network. There are two main losses (i.e., loss L1 and loss L2) of the third machine learning algorithm based on the two outputs. The loss L1 may be a cross entropy loss of the probability output with actual outcome. The actual probability may be calculated by actually counting the number of documents in similar context as given by the second machine learning algorithm which had 2nd Key phrase (say, KP2) when it had 1st key phrase (say, KP1), divided by number of those documents that had 1st key phrase (say, KP1). The loss L2 may be a loss for outputting the amount of difference of relationship vector to what it is expected. The L2 loss may be calculated with the help of subsequent machine learning algorithms.

Figure 8:
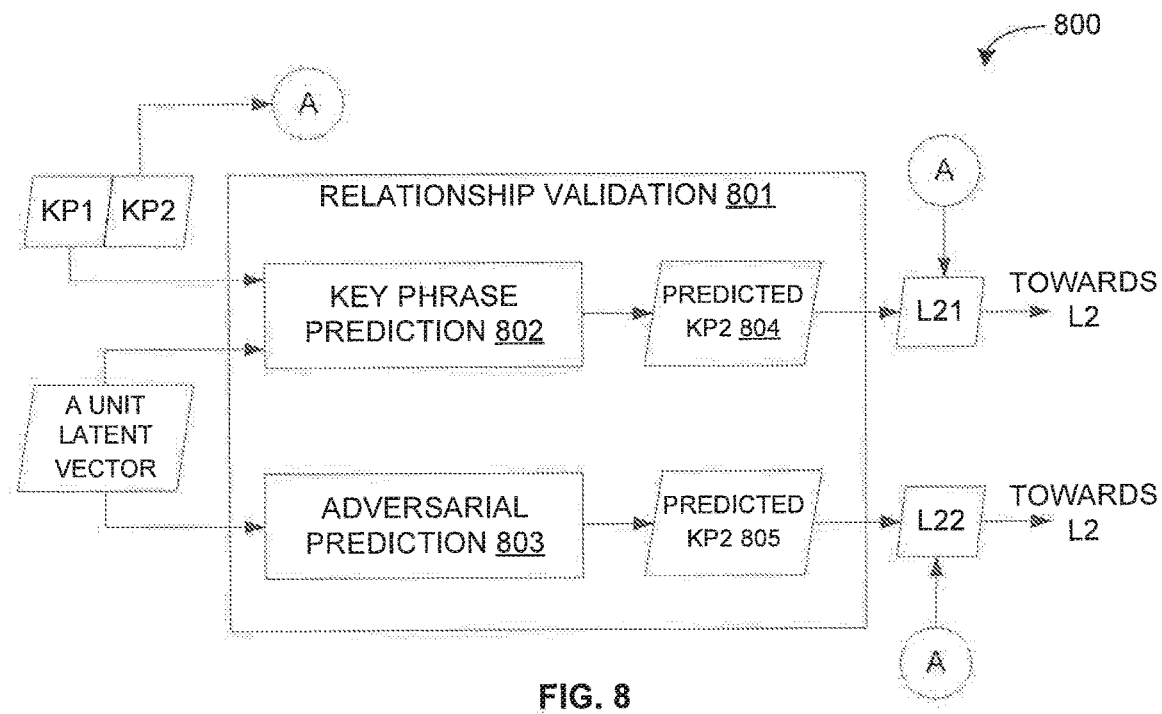
FIG. 8 is a flow diagram of an exemplary process for validating the relationship between the key phrases determined by the exemplary process of FIG. 7, in accordance with some embodiments of the present disclosure.

Referring back to FIG. 4, at step 406, the control logic 400 may validate the relationship between KPs in each key phrase pair as determined at step 405. Referring now to FIG. 8, exemplary control logic 800 for validating the relationship between the key phrases as determined at step 405 is depicted via a flowchart, in accordance with some embodiments of the present disclosure. As illustrated in the flowchart, at step 801, the control logic 800 may validate the relationship between the key phrases as determined at step 405 based on the key phrase pair and the unit latent vector. The validation at step 801 may be performed in two sub-steps described below.

At sub-step 802, the control logic 800 may predict one of the key phrases in the key phrase pair (say, KP2) based on the other key phrase in the key phrase pair (say, KP1) and the unit latent vector. As discussed above, in some embodiments, the key phrase prediction module 208 may build and train a fourth machine learning algorithm (e.g., artificial neural network) so as to predict one of the key phrases (say, KP2) in the key phrase pair based on the other key phrase (say, KP1) in the key phrase pair and the unit latent vector. The predicted key phrase (say, predicted KP2) 804 may then be compared with the actual key phrase (say, KP2) to compute a loss L21, which may be a part of loss L2.

The key phase prediction module 208 may quantitatively ensure that the relationship vector, also referred to as unit latent vector, is learning the relation the way it is expected to learn. The key phrase prediction module 208 may feed the 1st key phrase and the relationship vector as inputs to the fourth machine learning algorithm, which may then predict 2nd key phrase as output. The loss may be a function giving high value if the fourth machine learning algorithm predicts the 2nd key phase wrong, and low value if the fourth machine learning algorithm predicts the key phrase accurately. The fourth machine learning algorithm may be trained with the loss. If the fourth machine learning algorithm predicts correctly, this also means that the relationship extraction module 207 (i.e., the third machine learning algorithm) is outputting the 2nd key phrase correctly. Thus the relationship extraction module 207 may have low loss L21, which is as a part of loss L2. The fourth machine learning algorithm for predicting 2nd key phrase may also have low loss in such case.

Similarly, at sub-step 803, the control logic 800 may predict one of the key phrases in the key phrase pair (say, KP2) based only on the unit latent vector. As discussed above, in some embodiments, the adversarial prediction module 209 may build and train a fifth machine learning algorithm (e.g., artificial neural network) so as to predict one of the key phrases (say, KP2) in the key phrase pair based only on the unit latent vector. The predicted key phrase (say, predicted KP2) 805 may then be compared with the actual key phrase (say, KP2) to compute a loss L22, which may be a part of loss L2.

The adversarial prediction module 209 may prevent the relationship vector and the third machine learning algorithm to just forward 2nd key phrase. The adversarial prediction module 209 may feed the fifth machine learning algorithm with only the relationship vector, and not the 1st key phrase, and try to output 2nd key phrase. The loss of the fifth machine learning algorithm may be proportional to how wrong it predicts the 2nd key phrase. In other words, if the fifth machine learning algorithm learns to output 2nd key phrase correctly, it may get a high reward. On the other hand, the relationship extraction module 207 (i.e., the third machine learning algorithm) may get high loss for outputting bad relationship vector as this vector leaked details about 2nd Key phrase. These details may help the fifth machine learning algorithm to predict the key phrase without the need of 1st key phrase. The fifth machine learning algorithm may contribute as second part of loss L2 (i.e., loss L22) of the relationship extraction module 207.

As will be appreciated, the steps 401 through 406 may be repeated for each key phrase pair and for each learning resource in the learning resource corpus.

Referring back to FIG. 4, at step 407, the control logic 400 may generate a graph for all collected learning resources using KPs and relationships. Upon completion of training for all the documents, a graph of relations between concepts may be generated by dependency graph generation module 202. In the graph, each node may be represented by one key phrase (i.e., concept), the edges may show relation between the prerequisite and post requisite, and the thickness of the edges may be proportional to the amount of dependence of latter on former concept (i.e., importance of prerequisite).

A key phrase may be taken and randomly many different values of relationship vector may be produced and passed in key phrase prediction module 208. This may give various key phrase 2, out of which most of them will be related to the 1st key phrase. As will be appreciated, this is possible because the key phrase prediction module 208 is not over optimized for very particular vectors. The key phrase prediction module 208 may learn to use approximate vectors. So when there is a little change in best vector for a KP such that the nearest KP remains same KP, this vector may also represent the same KP. If a key phrase has too many relations, it may get more sensitive to change. With a little change in value of the vector, it may be sensitive enough to change predicted KP if a different KP becomes nearest.

The pairs of 1st key phrase made with each of identified related key phrases by the key phrase prediction module 208 may be pushed into a stack called as 'unverified pairs stack'. Each pair may then be taken and 10 documents, which has the pair, are inputted to the context determination module 206 and the relationship extraction module 207. The relationship extraction module 207 may output probabilities for all 10 documents. It is highly likely that they may have similar probabilities, as the documents having same key phrases may have similar or nearby context. An average of those probabilities may be taken so as to decide if 1st key phrase is the prerequisite of 2nd based on a set of pre-defined rules of probability.

In some embodiments, an exemplary set of rules of probability so as to determine parent-child relationship (or prerequisite/post requisite relation) may be defined as follows:
- a1) For a person to understand Multiplications, the person should know Addition first.
- a2) So Addition is a basics/parent/prerequisite to Multiplication.
- a3) Multiplication is an application/child/post requisite to Addition.
- b1) Linear Algebra is the basics to Machine Learning (ML).
- b2) ML is the basics to Supervised Learning (SL), Unsupervised Learning (USL), and Reinforcement Learning (RL)
- b3) ML, SL, USL, RL are the derivatives to AI.
- b4) Robotics is also the derivative to AI.
- 1) If the probability of occurrence of 1st in presence of 2nd is very high, and occurrence of 2nd in presence of 1st is low, chances is that 1st is the parent (prerequisite) of $2^{nd}$ (post requisite), and vice versa. For example, presence of "Machine Learning" in document having "Reinforcement Learning" is very high, whereas documents having Machine Learning may not have "Reinforcement Learning" that much because Machine Learning has more diverse sub branches and those papers could be on any of those, whereas "Reinforcement Learning" is just one sub branch.
- 2) If the probability of occurrence of 1st in presence of 2nd is high, and of 2nd in presence of 1st is high as well, none is parent or child but they are related and may have same common child or parent. For example, ML and Robotics have AI as the parent. The generator will create an undirected edge, with a different color than prerequisite, between the two.
- 3) If the probability of occurrence in presence of other is low for both, they are not related. For example, "dance" and "celestial bodies". No connections will be shown.

The dependency graph generation module 202 may push out the element of the unverified pair stack and place it in the graph based on the rules mentioned above. The dependency graph generation module 202 may add a directed branch in the graph, from a prerequisite to its post requisite. It has the thickness proportional to importance of prerequisite. The dependency graph generation module 202 may repeat the steps for all remaining key phrases in the corpus.

At step 408, the control logic 400 may provide a structured sequential learning path graph based on user query. By way of an example, when a user asks information about one keyword or key phrase, the learning path generation engine 200 may highlight a graph for that key phrase with all the sequence leading to that key phrase and all the sequences going out of that key phrase. The user interface may enable the user to mark the nodes he/she already know, so that the user may start learning from the nodes he/she doesn't know. When user selects a particular node, the learning path generation engine 200 may provide with a link to some reliable blogs' post, which is also having highest google ranking between all reliable blogs. The reliable blogs may be defined by users. The search done by the data collection module 201 may also include the parent node name for finding better explanation which is related to that context. In addition to that, the information may also give links to most rated courses or certifications, projects or any other opportunity to create more motivation to learn with achievement based learning style.

Additionally, by way of example, the learning path generation engine 200 may encourage the user to complete the learning path in a time bounded manner. When the user transmits to next node on their displayed learning path, the time spent in the previous node may be recorded. The average time for many users may be displayed as the estimate time for learning for the concept in that node. The interface may let the user mark the nodes he/she already knows. The time for learning the topic about which user is interested is the sum of the estimate time for learning the nodes which the user doesn't know.

Further, by way of example, the learning path generation engine 200 may encourage the user to widen his/her scope of learning. The learning path generation engine 200 may show complete path to the user, where the highlighted path is their learning path and non-highlighted is not essential for what users are finally trying to learn. So, this will automatically show users what other concepts that are related to any of the nodes they are learning, even though those may not be required for what they are finally trying to learn because they are not highlighted by the path. The user may see the amount of relation of concepts with the thickness of the outgoing and incoming edges to any node and may choose to learn about these concepts/nodes.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
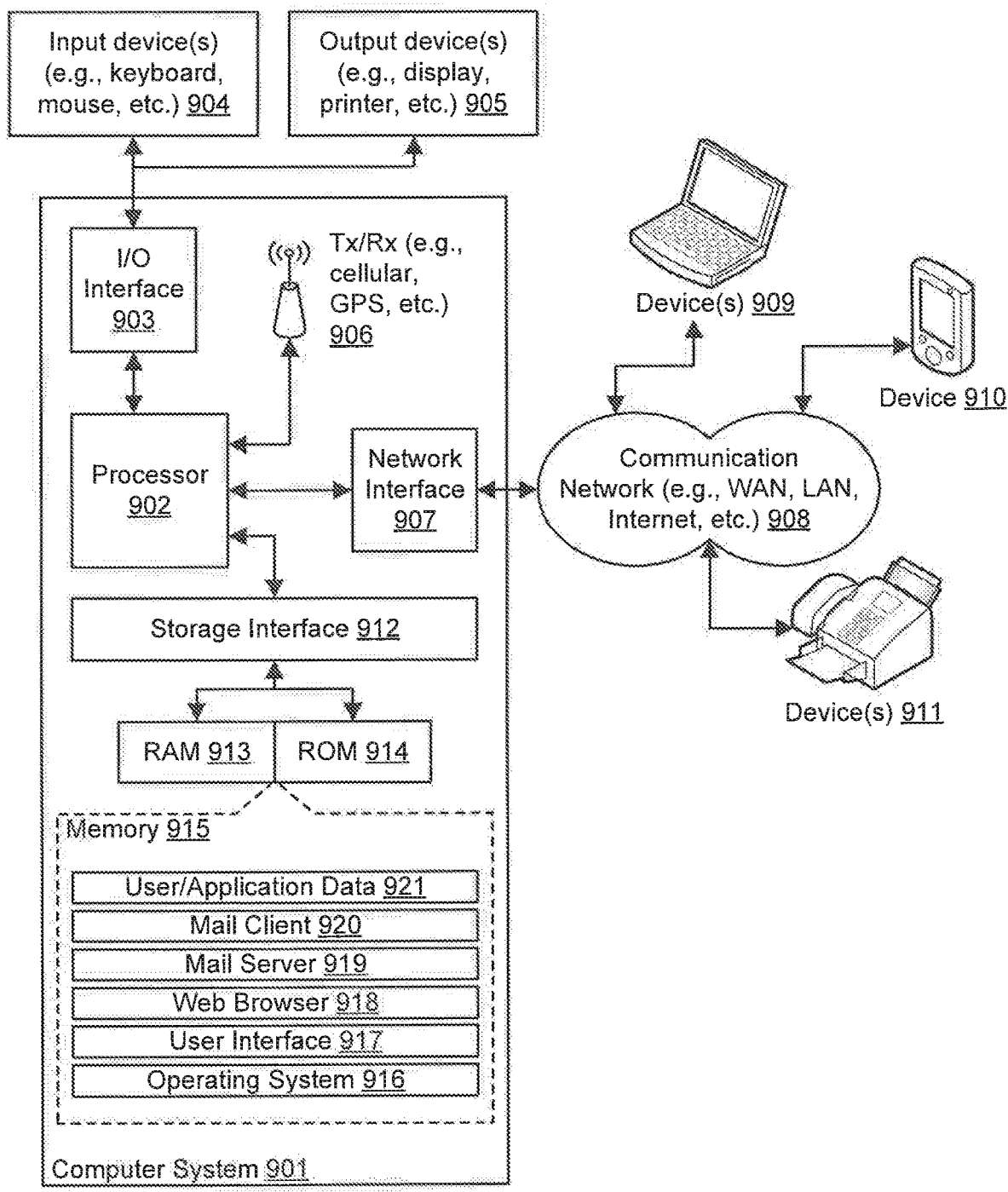
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing system 100 for generating a learning path using machine learning. Computer system 901 may include a central processing unit ("CPU" or "processor") 902. Processor 902 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802,11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, strollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 901 may implement a web browser 918 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 901 may implement a mail server 919 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (NAP), messaging application programming interface (MAPI), MICROSOFT® EXCHANGE®, post office protocol (POP), simple mail transfer protocol (SMTP), or the like. In some embodiments, the computer system 901 may implement a mail client 920 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 901 may store user/application data 921, such as the data, variables, records, etc. (e.g., topic of interest, learning resources, key phrases, learning context for each learning resource, key phrase groups, relationship among the key phrases in each key phrase group, a structured graph for the learning resources, learning path, personalized learning path, learning time, machine learning algorithms, tags, n-gram frequencies, probability of occurrence of a key phrase in a key phase group, a nature of relationships among the key phrases in a key phrase group, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, existing techniques fail to provide a way to fetch the information in a sequential way. Further, there is no mechanism to provide a planned and time bound learning path for any topic that is precisely tailored based on the learner's prior understanding and requirements.

In contrast, the claimed techniques, described in the various embodiments discussed above, may employ a number of machine learning algorithms (e.g., artificial neural networks) so as to generate a sequential learning path using a structured graph created using key phrases and their relation based on the context of any document.

As will be appreciated, the learning path generation engine 200 may create a precise learning path to follow in order to gain the understanding a user seeks, and also show the expected time for gaining this understanding. This enables them to have an efficiently planned learning experience. Not only will it show the essential steps to learn any particular thing, it will also show topics that are closely related that might interest the reader, further enhancing the learning experience. As will be appreciated by those skilled in the art, the techniques described in the various embodiments discussed above are not routine, or conventional, or well understood in the art. Thus, the claimed techniques improve the functioning of the learning path generation device and enable the learning path generation device to perform functions which the device could not perform earlier.

The specification has described method and system for generating a learning path using machine learning. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a learning path for a topic, the method comprising:
   extracting, by a learning path generation device, a plurality of key phrases from each of a plurality of learning resources related to the topic;
   determining, by the learning path generation device, a learning context for each of the plurality of learning resources based on the plurality of key phrases;
   forming, by the learning path generation device, a set of key phrase groups from among the plurality of key phrases for each of the plurality of learning resources;
   determining, by the learning path generation device, a relationship among the key phrases in each of the set of key phrase groups based on the learning context, wherein the relationship among the key phrases in a given key phrase group is determined, using a machine learning algorithm, by:
   determining a probability of occurrence of a key phrase in the given key phase group in presence of remaining key phrases in the given key phase group; and
   determining a nature of relationship among the key phrases, in the given key phase group, in a multi-dimension space, wherein the nature of relationship comprises a parent-child relationship, a prerequisite-post requisite relationship, a related relationship, or an independent relationship;
   generating, by the learning path generation device, a structured graph for the plurality of learning resources based on the plurality of key phrases and the relationship among the key phrases; and
   generating, by the learning path generation device, the learning path for the topic based on the structured graph for the plurality of learning resources.

2. The method of claim 1, further comprising:
   acquiring the plurality of learning resources related to the topic; and
   storing the plurality of learning resources in a database.

3. The method of claim 1, wherein the plurality of key phrases is extracted, using a first machine learning algorithm, by:
   determining a set of n-gram frequencies based on a set of tags in a given learning resource, and
   determining the plurality of key phrases based on the set of n-gram frequencies.

4. The method of claim 1, wherein the learning context is determined using a second machine learning algorithm, and wherein the second machine learning algorithm is a long short-term memory (LSTM) machine learning algorithm.

5. The method of claim 1, wherein key phrase groups comprise key phrase pairs, and wherein each of the set of key phrase pairs is formed by pairing each of the plurality of key phrases of a given learning resource with at least one of: each of a plurality of remaining key phrases of the given learning resource, or each of a plurality of randomly selected key phrases from a corpus of key phrases related to the topic.

6. The method of claim 1, further comprising:
   validating, using a fourth and a fifth machine learning algorithm, the relationship among the key phrases in the given key phrase group; and
   tuning the third machine learning algorithm based on the validation.

7. The method of claim 1, further comprising generating a personalized learning path for a user based on a current understanding of the user on the topic and the learning path for the topic, wherein the current understanding of the user is determined based on an input from the user on one or more prerequisites identified for the topic.

8. The method of claim 7, further comprising determining a learning time for the user based on the personalized learning path.

9. A system for generating a learning path for a topic, the system comprising:
   a learning path generation device comprising at least one processor and a computer-readable medium storing instructions that, when executed by the at least one processor, cause the at least one processor to perform operations comprising:
   extracting a plurality of key phrases from each of a plurality of learning resources related to the topic;

determining a learning context for each of the plurality of learning resources based on the plurality of key phrases;

forming a set of key phrase groups from among the plurality of key phrases for each of the plurality of learning resources;

determining a relationship among the key phrases in each of the set of key phrase groups based on the learning context, wherein the relationship among the key phrases in a given key phrase group is determined, using a machine learning algorithm, by:

determining a probability of occurrence of a key phrase in the given key phase group in presence of remaining key phrases in the given key phase group; and determining a nature of relationship among the key phrases, in the given key phase group, in a multi-dimension space, wherein the nature of relationship comprises a parent-child relationship, a prerequisite-post requisite relationship, a related relationship, or an independent relationship;

generating a structured graph for the plurality of learning resources based on the plurality of key phrases and the relationship among the key phrases; and generating the learning path for the topic based on the structured graph for the plurality of learning resources.

10. The system of claim 9, wherein the plurality of key phrases is extracted, using a first machine learning algorithm, by:

determining a set of n-gram frequencies based on a set of tags in a given learning resource, and determining the plurality of key phrases based on the set of n-gram frequencies.

11. The system of claim 9, wherein the learning context is determined using a second machine learning algorithm, and wherein the second machine learning algorithm is a long short-term memory (LSTM) machine learning algorithm.

12. The system of claim 9, wherein key phrase groups comprise key phrase pairs, and wherein each of the set of key phrase pairs is formed by pairing each of the plurality of key phrases of a given learning resource with at least one of: each of a plurality of remaining key phrases of the given learning resource, or each of a plurality of randomly selected key phrases from a corpus of key phrases related to the topic.

13. The system of claim 9, wherein the operations further comprise:

validating, using a fourth and a fifth machine learning algorithm, the relationship among the key phrases in the given key phrase group; and tuning the machine learning algorithm based on the validation.

14. The system of claim 9, wherein the operations further comprise generating a personalized learning path for a user based on a current understanding of the user on the topic and the learning path for the topic, and wherein the current understanding of the user is determined based on an input from the user on one or more prerequisites identified for the topic.

15. The system of claim 14, wherein the operations further comprise determining a learning time for the user based on the personalized learning path.

16. A non-transitory computer-readable medium storing computer-executable instructions for generating a learning path for a topic, the computer-executable instructions configured for:

extracting a plurality of key phrases from each of a plurality of learning resources related to the topic;

determining a learning context for each of the plurality of learning resources based on the plurality of key phrases;

forming a set of key phrase groups from among the plurality of key phrases for each of the plurality of learning resources;

determining a relationship among the key phrases in each of the set of key phrase groups based on the learning context, wherein the relationship among the key phrases in a given key phrase group is determined, using a machine learning algorithm, by:

determining a probability of occurrence of a key phrase in the given key phase group in presence of remaining key phrases in the given key phase group; and determining a nature of relationship among the key phrases, in the given key phase group, in a multi-dimension space, wherein the nature of relationship comprises a parent-child relationship, a prerequisite-post requisite relationship, a related relationship, or an independent relationship;

generating a structured graph for the plurality of learning resources based on the plurality of key phrases and the relationship among the key phrases; and generating the learning path for the topic based on the structured graph for the plurality of learning resources.

\* \* \* \* \*